United States Patent [19]

Frye et al.

[11] 4,163,372

[45] Aug. 7, 1979

[54] CAPILLARY RETAINER CLIP

[75] Inventors: Leonard V. Frye, Syracuse; Robert F. Crossman, DeWitt, both of N.Y.

[73] Assignee: Carrier Corporation, Syracuse, N.Y.

[21] Appl. No.: 845,020

[22] Filed: Oct. 25, 1977

[51] Int. Cl.² .............................................. F25B 25/00
[52] U.S. Cl. ...................................... 62/259; 62/262; 174/175; 24/130; 248/68 R
[58] Field of Search ................. 62/262, 263, 259, 511, 62/525; 248/68 CB, 68 R, 69, 67.5, 74 A, 74 R; 285/61.137 R; 211/60 R; 174/99 R, 175; 24/81 CC, 81 F, 129 B, 129 R, 130

[56] References Cited

U.S. PATENT DOCUMENTS

| D. 207,057 | 2/1967 | Palmer | 174/175 |
|---|---|---|---|
| 2,534,690 | 12/1950 | Young, Jr. et al. | 248/74 R X |
| 2,682,159 | 6/1954 | Trask | 62/262 |
| 2,733,290 | 1/1956 | Valiulis | 248/68 R |
| 2,997,531 | 8/1961 | Oldham et al. | 248/74 A |
| 3,262,662 | 7/1966 | Gastaldi | 248/68 R |
| 3,425,022 | 1/1969 | Walter et al. | 174/99 R |
| 3,894,706 | 7/1975 | Mizusawa | 248/68 CB |

FOREIGN PATENT DOCUMENTS 784043 10/1957 United Kingdom .................... 174/174

*Primary Examiner*—Stephen J. Novosad
*Assistant Examiner*—Nick A. Nichols, Jr.
*Attorney, Agent, or Firm*—J. Raymond Curtin; Robert P. Hayter

[57] ABSTRACT

Apparatus for securing capillary and other tubes within a refrigeration machine. A capillary retainer clip having a plurality of sections affixed thereto is mounted within a refrigeration machine such that the sections extending therefrom form elongated openings and spaced regions therebetween. The tubes are inserted between the sections such that the sections are displaced as the tube is slid through the opening to the spaced region. When the tube is in the spaced region the sections then return to their original position securing the tube within the spaced region.

6 Claims, 4 Drawing Figures

CAPILLARY RETAINER CLIP

BACKGROUND OF THE INVENTION

1. Field of the Invention

The present invention relates to refrigeration apparatus and particularly to a capillary retainer clip for securing capillary and other small diameter tubes within a refrigeration machine.

2. Description of the Prior Art

Various refrigeration machines arranging in size from room air conditioners that are typically mounted in a window or through the wall to large commercial rooftop units often use capillary tubes as the expansion control device within a conventional refrigeration circuit. Other small diameter tubes are used for the various control mechanisms within the refrigeration machine. Particularly high and low pressure switches are actuated through a small diameter tube connected to the various components within the refrigeration machine at the point from which pressure is to be determined.

These various small diameter tubes may be free-standing within the machine between the connections at either end. When these tubes are free-standing there is potential for rubbing between themselves and between the tubes and the other internal components of the machine due to vibration during operation as well as other movement during transportation of the machine. The rubbing creates a possibility of the tubes being damaged or having holes worn therein. Typically refrigerant is contained within the capillary so that any damage to the capillary may result in loss of refrigerant for the refrigeration system or, if the damage is to a pressure sensing device, replacement of the device may be necessitated.

These capillary tubes have previously been secured within the refrigeration machine by the provision of a plastic clip that would encircle each capillary and be screwed to a component of the machine. Such apparatus requires a separate screw for each tube to be secured and for each location of that tube to be secured as well as requiring that the screw be removed if the capillary tube is to be removed from the equipment.

SUMMARY OF THE INVENTION

It is an object of the present invention to provide a capillary retaining clip for securing capillary and other small diameter tubes within a refrigeration machine.

It is another object of the present invention to have a clip for securing capillary tubes which does not necessitate the installation or removal of a screw each time the capillary is secured or removed.

It is yet another object of the present invention to manufacture a cheap, efficient and economical capillary retaining clip which may be used both with various size capillaries and interchangeably in various refrigeration machines.

It is another object of the present invention to provide a capillary retaining clip which has several faces that may be secured to an internal component of the refrigeration machine.

It is another object of the present invention to provide a capillary retaining clip which may be used simultaneously with various sized capillary tubes within the same refrigeration machine.

A still more specific object of the invention is to manufacture a capillary retaining clip having generally narrowing slots so that capillary tubes may be easily slid therein to secure the tubes.

Other objects will be apparent from the description to follow and from the appended claims.

The preceding objects are achieved according to a preferred embodiment of the invention by the provision of a clip body on which are mounted a plurality of sections. Adjacent sections define an elongated opening therebetween, said opening being generally wider at the end of the sections furthest from the clip body and narrowing towards the end of the opening adjacent the clip body. The confronting sides of the opening form a plurality of spaced regions of varying sizes so that capillary tubes of varying diameters may be secured in the spaced regions of the openings. Attached to clip body is the clip base, said base having screw slots therein to enable the retaining clip to be mounted within a refrigeration machine.

DESCRIPTION OF THE PREFERRED EMBODIMENT

The embodiment of the invention described below is adapted for use in varying sizes of refrigeration machines. It is to be understood that this capillary retaining clip is specifically designed to be interchangeable in numerous machines and consequently it is provided with capillary retaining regions of varying sizes. Depending upon the number of different size capillary tubes being utilized it is expected that one or two capillary retainer clips with varying sized regions may be sufficient to secure capillary tubes throughout the range of refrigeration machines from the smallest room air conditioner to the largest commercial installations.

In a typical vapor compression refrigeration cycle a compressor is used to increase the pressure and temperature of a gaseous refrigerant. The now hot gaseous refrigerant is cooled in a condenser and changes state to a liquid. The liquid refrigerant is then passed through an expansion control device which decreases the pressure of the refrigerant. The then decreased pressure refrigerant is converted from a liquid to a gas in an evaporator absorbing heat from the fluid to be cooled in the process, said gaseous refrigerant then returning to the compressor to commence the same cycle again. The expansion control device may take several forms, the most economical expansion control device being a small diameter tube known as a capillary tube. The capillary tube has such a small inside diameter and consequent high pressure drop over its length, that the high pressure refrigerant received from the condenser is discharged as low pressure refrigerant into the evaporator.

Other small diameter or capillary tubes are found in the refrigeration machine for monitoring the refrigeration cycle. A typical example would be either a high pressure or low pressure limit switch or gauge, said switch being connected to the portion of the refrigeration machine to be monitored by a capillary tube which would then contain refrigerant at the pressure of the area being monitored to indicate said pressure to the switch.

Figure 1:
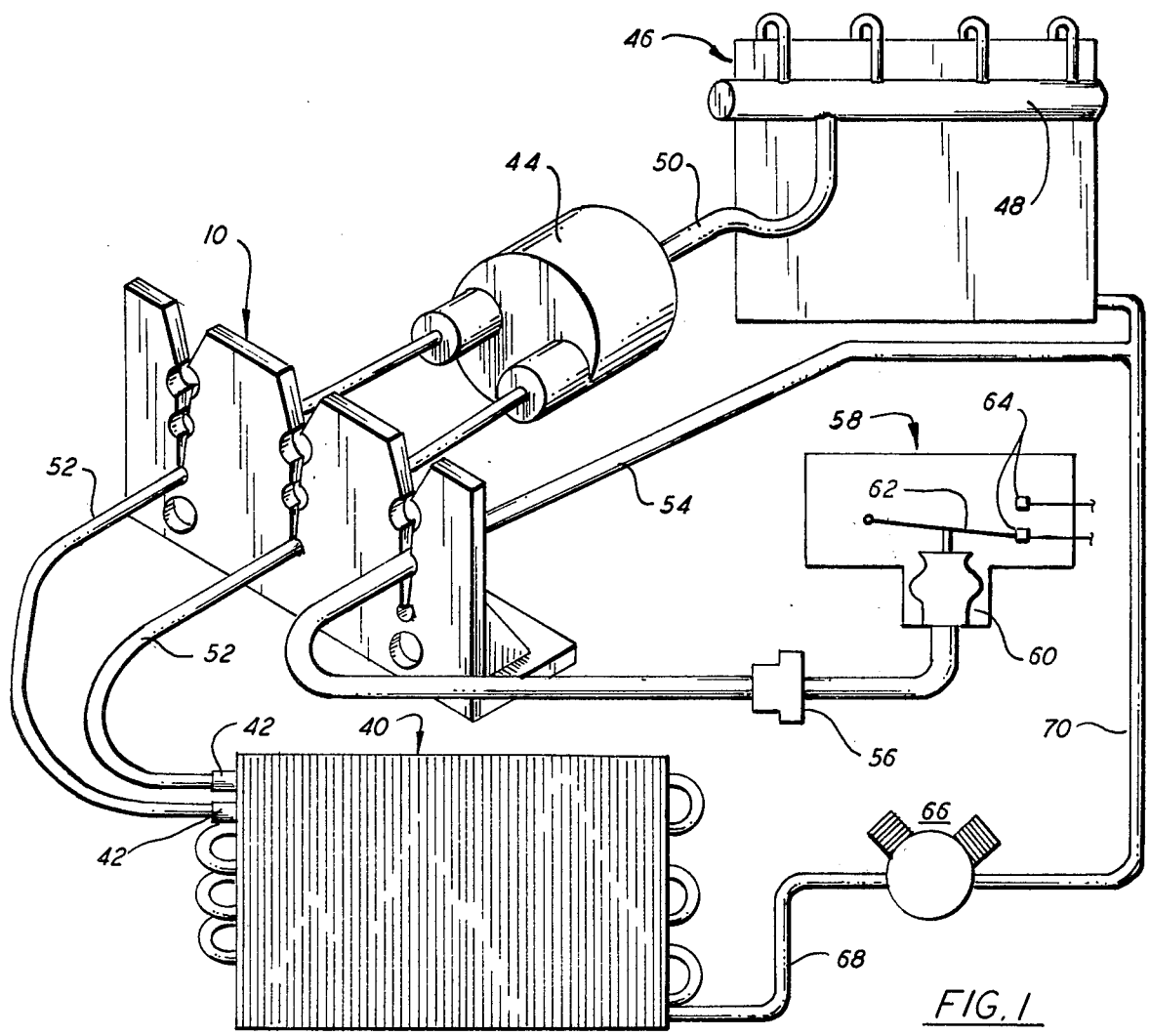
FIG. 1 is a pictorial diagramatic view of a refrigeration machine with the present invention.

Referring to the drawings, FIG. 1 shows in a schematic plan view a condenser 46 connected to header 48 which is connected by conduit 50 to boot 44. Boot 44 divides the refrigerant flow from condenser 46 into capillary tubes 52. Capillary tubes 52 are connected to evaporator inlets 42 of evaporator 40. Evaporator 40 is connected by line 68 to compressor 66 which is connected to condenser 46 by pipe 70 to complete the refrigeration circuit.

Also connected to pipe 70 is control tube 54 which is then connected to coupling 56. Pressure switch 58 comprising coupling 56, diaphragm 60, lever arm 62, and electrical contacts 64 is connected to the control tube 54. As can be seen in FIG. 1 capillary tubes 52 and control tubes 54 are secured within the openings of capillary retainer clip 10.

As described above, the apparatus shown on FIG. 1 will have liquid refrigerant originating in condenser 46 traveling through condenser header 48, conduit 50, and boot 44 to capillaries 52. In capillaries 52, the high pressure refrigerant received from the condenser would, as a result of the small inside diameter of the capillary, be reduced in pressure and discharged through evaporator inlets 42 to evaporator 40 where the refrigerant would change state from a liquid to a gas absorbing heat from the fluid to be cooled. The gaseous refrigerant would then be compressed to a liquid by compressor 66 and conducted by pipe 70 to condenser 46 to complete the refrigeration circuit. Control tube 54 being connected pipe 70 would sense the discharge pressure from the compressor in pipe 70 and convey that pressure to pressure switch 58. If that pressure exceeds the predetermined level for which pressure switch 58 was calibrated, diaphragm 60 will be expanded by the increased pressure moving lever 62 so that contacts 64 are engaged thereby actuating whatever overpressure mechanism is desired.

Figure 2:
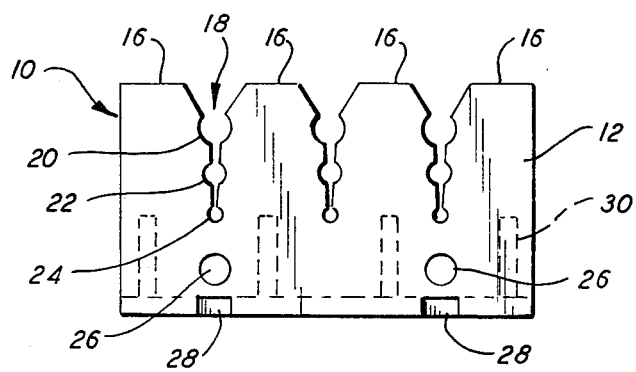
FIG. 2 is a front view of the capillary retaining clip.
Figure 4:
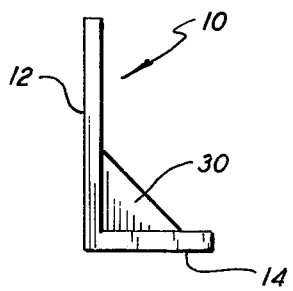
FIG. 4 is an end view of the clip as shown in FIG. 2.
Figure 3:
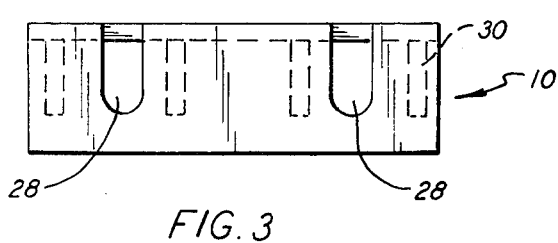
FIG. 3 is a top view of the clip as shown in FIG. 2.

Referring to FIG. 2, front view of capillary retainer clip 10, it can be seen that clip body 12 has a plurality of sections 16. Between adjacent sections 16 are elongated openings 18 having spaced regions comprising large opening portion 20, intermediate opening portion 22 and small opening portion 24. Opening 18 is wider at the end furthest from the clip body to enable the capillary tube to be slid easily into opening 18 and then down through the various opening portions in progression. Opening 18 generally narrows from the end furthest from the clip body to the end closest to the clip body. The opening portions are so designed that their diameter is greater than the width of the slot adjacent thereto so that when a capillary tube is placed within the opening portion it will be retained therein by confronting sides of the sections adjacent thereto. Also shown in FIG. 2 are screw openings 26 in the clip body portion of the capillary retainer clip so that the retainer clip may be mounted to a surface parallel to the face of the capillary retainer clip shown in FIG. 2. Also seen thereon are screw slots 28 said slots beginning in the face of capillary retaining clip shown in FIG. 2 and extending into part of clip base 14 as shown in FIG. 3. Angle brackets 30 are used to firmly secure the base 14 to clip body 12. The combination of screw holes 26 and screw slots 28 allow for the capillary retainer clip to be mounted to an internal component of the refrigeration machine either perpendicular to the desired direction of the face of the capillary retainer clip or parallel thereto.

The invention has been described in detail with particular reference to a preferred embodiment thereof, but it will be understood that variations and modifications can be effected within the spirit and the scope of the invention.

We claim:

1. A refrigeration machine comprising a condenser, an evaporator, an expansion control device and a compressor for forming a closed refrigeration circuit, the expansion control device including a capillary tube mounted to conduct refrigerant from the condenser to the evaporator and means for supporting the capillary tube intermediate the ends thereof, said means including a retainer having a plurality of spaced resilient sections, the sections being formed to define elongated openings therebetween, the confronting sides of which form a spaced region adapted to forcibly engage the exterior surface of the capillary tube as it is passed through said elongated opening.

2. The invention as set forth in claim 1 wherein the means for supporting the capillary tube further includes a base having means to be attached within the refrigeration machine for securing the means for supporting the capillary tube.

3. The invention as set forth in claim 1 wherein the elongated openings between the sections have a plurality of spaced regions of varying sizes formed by the confronting sides of the elongated openings such that different size capillary tubes may be engaged within the regions.

4. The invention as set forth in claim 3 wherein the elongated openings are wider at the end which first receives the capillary tube and taper inwardly such that they are narrower at the opposite end, the spaced regions being circular in configuration and also decreasing in diameter along the length of the elongated opening.

5. A refrigeration machine comprising a condenser, an evaporator, an expansion control device and a compressor for forming a closed refrigeration circuit, a capillary tube for monitoring the refrigeration machine operation and means for supporting the capillary tube intermediate the ends thereof, said means including a retainer having a plurality of spaced resilient sections, the sections being formed to define elongated openings therebetween, the confronting sides of which form a spaced region adapted to forcibly engage the exterior surface of the capillary tube as it is passed through said elongated opening.

6. The invention as set forth in claim 5 wherein the elongated opening between the sections have a plurality of spaced regions being circular in configuration and of varying sizes formed by the confronting sides of the elongated openings such that different size capillary tubes may be engaged within the regions and wherein said elongated openings taper from a wider end to a narrower end.

* * * * *